United States Patent
Wagener et al.

(10) Patent No.: US 10,031,504 B2
(45) Date of Patent: Jul. 24, 2018

(54) METHOD AND DEVICE FOR MANAGING AND CONFIGURING FIELD DEVICES IN AN AUTOMATION INSTALLATION

(71) Applicant: ABB TECHNOLOGY AG, Zurich (CH)

(72) Inventors: Dirk Wagener, Stadthagen (DE); Christoph Welte, Neu-Ulm (DE); Marcus Heege, Kaisersesch (DE); Wolfgang Mahnke, Hettenleidelheim (DE); Marko Schlueter, Espelkamp (DE)

(73) Assignee: ABB Schweiz AG, Baden (CH)

( * ) Notice: Subject to any disclaimer, the term of this patent is extended or adjusted under 35 U.S.C. 154(b) by 374 days.

(21) Appl. No.: 14/930,691

(22) Filed: Nov. 3, 2015

(65) Prior Publication Data
US 2016/0124423 A1     May 5, 2016

(30) Foreign Application Priority Data

Nov. 3, 2014    (DE) ......................... 10 2014 016 180

(51) Int. Cl.
| | | |
|---|---|---|
| *G06F 15/16* | (2006.01) | |
| *G05B 19/05* | (2006.01) | |
| *G05B 19/042* | (2006.01) | |

(52) U.S. Cl.
CPC ........... *G05B 19/05* (2013.01); *G05B 19/042* (2013.01); *G05B 2219/13144* (2013.01);
(Continued)

(58) Field of Classification Search
CPC .................. G05B 19/05; G05B 19/042; G05B 2219/25068; G05B 2219/25066;
(Continued)

(56) References Cited

U.S. PATENT DOCUMENTS 6,618,745 B2 * 9/2003 Christensen ......... G05B 19/042
702/182
2001/0052858 A1 * 12/2001 Vincent ................ G05B 19/042
340/12.25
(Continued)

FOREIGN PATENT DOCUMENTS

| CN | 101147139 A | 3/2008 |
|---|---|---|
| CN | 102150090 A | 8/2011 |

(Continued)

*Primary Examiner* — Ronald D Hartman, Jr.
(74) *Attorney, Agent, or Firm* — Leydig, Voit & Mayer, Ltd.

(57) ABSTRACT

A method/device for managing/configuring field devices in an automation installation with a configuration tool designed to physically identify a field device therein, to logically incorporate it into, and configure it in, the automation installation, wherein the configuration tool to uses a prescribed field-device-type-specific information package describing functions and data of the field device at least partially and wherein the configuration tool has a server and a client, the server being designed to integrate received configuration data with the field-device-type-specific information package into an information package and to validate and process the information package with a piece of validation logic, and the client having a user interface for taking the configuration data. To avoid bottlenecks in the client/server communication, the client is equipped with an information package instance, and is designed to integrate taken configuration data into a package and validate the package. The server is designed to take validated packages.

6 Claims, 1 Drawing Sheet

(52) U.S. Cl.
CPC .............. *G05B 2219/15006* (2013.01); *G05B 2219/25061* (2013.01); *G05B 2219/25066* (2013.01); *G05B 2219/25068* (2013.01); *G06F 15/16* (2013.01); *Y02P 90/265* (2015.11)

(58) Field of Classification Search
CPC ........... G05B 2219/25061; G05B 2219/13144; G05B 2219/15006; Y02P 90/265
See application file for complete search history.

(56) References Cited

U.S. PATENT DOCUMENTS

| | | | |
|---|---|---|---|
| 2003/0014536 A1* | 1/2003 | Christensen | G05B 19/042 709/238 |
| 2006/0230104 A1 | 10/2006 | Winter | |
| 2011/0153786 A1 | 6/2011 | Merkel et al. | |
| 2011/0314080 A1 | 12/2011 | Herberth et al. | |
| 2012/0054603 A1 | 3/2012 | Demant et al. | |
| 2013/0131840 A1* | 5/2013 | Govindaraj | G05B 19/41865 700/19 |
| 2016/0124423 A1* | 5/2016 | Wagener | G05B 19/042 700/19 |
| 2016/0226980 A1* | 8/2016 | Albrecht | H04L 12/02 |
| 2017/0104826 A1* | 4/2017 | Sait | G05B 19/41855 |

FOREIGN PATENT DOCUMENTS

| | | |
|---|---|---|
| CN | 104049583 A | 9/2014 |
| DE | 102009054901 A1 | 6/2011 |
| DE | 102014103377 A1 | 9/2014 |
| EP | 1691306 A1 | 8/2006 |

\* cited by examiner

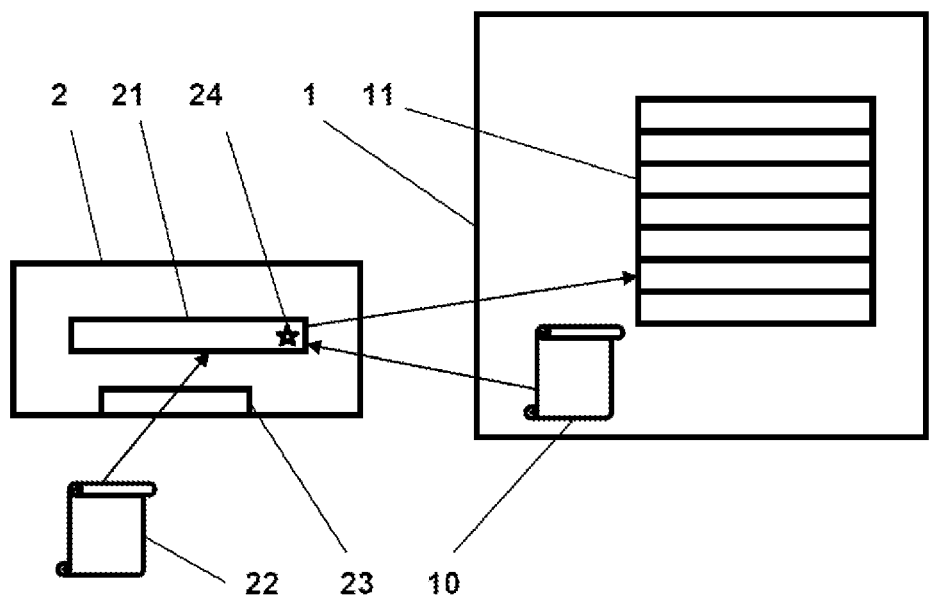

METHOD AND DEVICE FOR MANAGING AND CONFIGURING FIELD DEVICES IN AN AUTOMATION INSTALLATION

CROSS-REFERENCE TO RELATED APPLICATIONS

Priority is claimed to German Patent Application No. DE 10 2014 016 180.3, filed on Nov. 3, 2014, the entire disclosure of which is hereby incorporated by reference herein.

FIELD

The invention relates to a method and a device for managing and configuring field devices in an automation installation. The invention can be used particularly in process automation or machine control for controlling processes and/or installation components.

BACKGROUND

Automation systems for controlling a technical process or a technical installation usually comprise a control device (PLC), which are integrated in a complex comprising a multiplicity of intelligent electrical devices. Intelligent electronic devices are microprocessor-based devices such as protective and control devices, motor protection devices, intelligent switches and voltage regulators, frequency converters, pressure and temperature measurement transducers, flowmeters and servo drives.

The article "FDI Device Integration—Best of Both Worlds", atp edition June 2010, pages 16 to 19, discloses the practice of integrating field devices with the FDI concept (Field Device Integration IEC—62769) into an automation installation. The basis for this concept is the provision of information for configuring field devices in a device-specific FDI package. This FDI package comprises a firmly prescribed quantity of information that consists of device definition, business logic, user interface description and user interface plugins. The device definition comprises management information and the device model. The business logic describes the communication logic for the device and is used for ensuring consistency for the device model. The user interface description describes the presentation of the device parameters and device functions. The user interface plugins are programmed components of interface portions for presenting the device parameters and functions.

When field devices are configured by means of EDD (Electronic Device Description) technology IEC 61804, a device manufacturer provides an EDD that contains information about the communication with the device, the business logic and the user interfaces, that is to say what input masks should be presented to a user. By way of example, the business logic includes when what parameters can be written.

FDI technology uses these mechanisms of the EDD and provides the concept of the FDI package, in which, besides an EDD, other information such as a user handbook can be included, but also what are known as UIPs (User Interface Plugins), which provide further user interfaces in other technologies, such as .NET Assemblies, which, in contrast to EDD-based user interfaces, consist of programmed code compiled to form a component.

FDI packages are typically produced by device manufacturers and used by system manufacturers in order to integrate and configure the devices of the device manufacturers in their system.

The EDD may define not only a single user element with various parameters, graphs and other elements but also new windows and dialogs. In this case, a host has certain degrees of freedom and, by way of example, can present a plurality of menus defined in the EDD in different windows simultaneously, or else user interfaces of different device instances.

Furthermore, the EDD specification allows an input context to be defined that contains changes to a device configuration that the user has already made on the interface but has not yet written to the device or the offline configuration.

In such a programming tool, information relating to the devices is visualized and functions such as parameterization operations are performed. To this end, the user first needs to select a device from a multiplicity of devices.

Field devices are described using EDD files. This EDD is used to provide both the device-specific information relating to the communication with the field device via a field bus and all the elements for configuration and for monitoring of the field device by means of an appropriate user interface. In this case, the EDD defines logic that needs to be able to be implemented for every change in a single device parameter.

In a client/server architecture such as in FDI, the EDD is processed on the server, and the user interface itself is provided on a client in this case. For the purpose of configuring a field device, an appropriate user interface is activated on the server for every change in a value in accordance with the processing logic defined in the EDD. This necessitates intensive interaction between the client and the server for every change in a parameter in the parameterization interface. During the editing process, the content to be presented and altered values additionally need to be repeatedly transmitted from the portion processing EDD to the user interface.

In a system having a large number of field devices and clients, this results in bottlenecks in the client/server communication and hence in user interfaces whose reaction response over time no longer meets the usual requirements.

SUMMARY

An aspect of the invention provides a device for managing and configuring field devices in an automation installation, the device comprising: a configuration tool designed to physically identify a field device in the automation installation, to logically incorporate the field device into the automation installation, and to configure the field device in the automation installation, wherein the configuration tool uses a prescribed field-device-type-specific information package, wherein the information package describes functions and data of the field device at least in part, wherein the configuration tool includes a server and a client, wherein the server is configured to integrate received configuration data, with the field-device-type-specific information package, into a field-device-specific information package, wherein the server is configured to validate and process the field-device-specific information package using a piece of validation logic, wherein the client includes a user interface configured to take the configuration data, wherein the client includes an instance of the field-device-type-specific information package, wherein the client is configured to integrate taken configuration data into a field-device-specific information package, wherein the client is configured to validate the field-device-specific information package, and wherein the server is configured to take validated field-device-specific information packages.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a configuration tool that is designed to physically identify a field device in the automation installation, to logically incorporate it into the automation installation and to configure it in the automation installation.

DETAILED DESCRIPTION

An aspect of the invention is based on specifying a method and a device for managing and configuring field devices in an automation installation with a configuration tool in a client/server architecture that have a time response that avoids bottlenecks in the client/server communication.

An aspect of the invention provides a device for managing and configuring field devices in an automation installation with a configuration tool that is designed to physically identify a field device in the automation installation, to logically incorporate it into the automation installation and to configure it in the automation installation, wherein the configuration tool to this end resorts to a prescribed field-device-type-specific information package that describes the functions and the data of the field device at least in part and wherein the configuration tool consists of at least one server and at least one client, wherein the server is designed to integrate received configuration data with the field-device-type-specific information package into a field-device-specific information package and to validate and process the field-device-specific information package by means of a piece of validation logic, and wherein the client has a user interface for taking the configuration data.

In line with the device, An aspect of the invention provides for the client to be equipped with an instance of the field-device-type-specific information package. The client is designed to take the field-device-type-specific information package as a basis for forming a field-device-specific information package that has the taken field-device-individual configuration data. The field-device-type-specific information package is turned into an individual field-device-specific information package by the field-device-individual configuration data.

Furthermore, the client is designed to validate the field-device-specific information package. To this end, functions of the field-device-type-specific information package are performed.

The server is designed to take validated field-device-specific information packages. In the process, field-device-specific information packages that have already been validated in the client are prevented from being validated once again in the server.

Advantageously, the configuration data taken by the client are validated directly in the client without client/server communication and only the validated configuration data are transmitted to the server.

According to a further feature of the invention, an instance of the validation logic is implemented on the client. Specifically, this instance is implemented on the client during the editing process. During the editing process, client/server communication is therefore not required or is required only to a very restricted degree. Following confirmation of the changes in the user interface, only those values of the field-device-specific information package that are changed by the user or by the processing logic defined in the field-device-type-specific information package are transmitted to the server.

On the server, the communication portion defined in the relevant field-device-type-specific information package is then carried out on the basis of the changed values without reimplementing the logic defined in the field-device-type-specific information package for validating changes in device parameters.

According to a further feature of the invention, the field-device-specific information package validated in the client has a validation flag that represents its validation state.

Advantageously, the server recognizes the validation state of the received field-device-specific information package from the validation flag. Field-device-specific information packages that are received in already validated form require no further validation and are transferred directly to the configuration of the automation installation, whereas field-device-specific information packages that are received in invalidated form are first validated before they are transferred to the configuration of the automation installation.

In line with the method, the invention provides for a first step to involve an instance of the validation logic being loaded into the client and implemented. In a second step, a field-device-specific information package is formed from the taken configuration data and the field-device-type-specific information package. In a third step, the field-device-specific information package is validated directly in the client.

Next, the validated field-device-specific information package is transmitted from the client to the server. In the server, the validated field-device-specific information package is accepted as validated and transferred to the configuration of the automation installation.

According to a further feature of the invention, the configuration data validated in the client are flagged as validated using a validation flag.

Advantageously, the server recognizes the validation state of the received field-device-specific information package from the validation flag. Field-device-specific information packages that are received in already validated form require no further validation and are transferred directly to the configuration of the automation installation, whereas field-device-specific information packages that are received in invalidated form are first validated before they are transferred to the configuration of the automation installation.

The invention is explained in more detail below with reference to an exemplary embodiment. The single FIGURE shows a configuration tool that is designed to physically identify a field device in the automation installation, to logically incorporate it into the automation installation and to configure it in the automation installation, in a client/server architecture consisting of a server 1 and a client 2.

The server 1 stores at least one field-device-type-specific information package 10 that describes the functions and data of the field device at least in part. In a particular embodiment of the invention, this field-device-type-specific information package 10 is an EDD file.

Furthermore, the server 1 stores the installation configuration 11, which comprises the configuration data of all the field devices in the automation installation.

The client 2 has a user interface 23 for taking configuration data 22.

According to the features of the invention, the client 2 is equipped with an instance of the field-device-type-specific information package 10. The field-device-type-specific information package 10 is transformed into an individual field-device-specific information package 21 in the client 2 by the inclusion of the taken configuration data 22.

This field-device-specific information package 21 is validated in the client 2 on the basis of the functions and data of the field-device-type-specific information package 10. A validated field-device-specific information package 21 is marked with a validation flag 24 that represents the validation state of the field-device-specific information package 21.

The validated field-device-specific information package 21 is sent from the client 2 to the server 1. The server 1 recognizes the validation state of the field-device-specific information package 21 from the validation flag 24 and transfers the validated field-device-specific information package 21 to the installation configuration 11 without validation of its own.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SYMBOLS

1 Server
10 Field-device-type-specific information package
11 Installation configuration
2 Client
21 Field-device-specific information package
22 Configuration data
23 User interface
24 Validation flag

The invention claimed is:

1. A device for managing and configuring field devices in an automation installation, the device comprising:
a configuration tool designed to physically identify a field device in the automation installation, to logically incorporate the field device into the automation installation, and to configure the field device in the automation installation,
wherein the configuration tool uses a prescribed field-device-type-specific information package,
wherein the information package describes functions and data of the field device at least in part,
wherein the configuration tool includes a server and a client,
wherein the server is configured to integrate received configuration data, with the field-device-type-specific information package, into a field-device-specific information package,
wherein the server is configured to validate and process the field-device-specific information package using a piece of validation logic,
wherein the client includes a user interface configured to take the configuration data,
wherein the client includes an instance of the field-device-type-specific information package,
wherein the client is configured to integrate taken configuration data into a field-device-specific information package,
wherein the client is configured to validate the field-device-specific information package,
wherein the server is configured to take validated field-device-specific information packages, and
wherein the validated field-device-specific information packages transmitted to the server are used to control at least a part of the automation installation.

2. The device of claim 1, wherein an instance of the validation logic is implemented on the client.

3. The device of claim 2, wherein the field-device-specific information package validated in the client includes a validation flag representing its validation state.

4. The device of claim 1, wherein the field-device-specific information package validated in the client includes a validation flag representing its validation state.

5. A method for managing and configuring field devices in an automation installation with a configuration tool that is designed to physically identify a field device in the automation installation, to logically incorporate it into the automation installation and to configure it in the automation installation, wherein the configuration tool uses a prescribed field-device-type-specific information package describing functions and data of the field device at least in part and wherein the configuration tool includes a server and a client, wherein the server is configured to integrate received configuration data with the field-device-type-specific information package into a field-device-specific information package and to validate and process the field-device-specific information package using a piece of validation logic, and wherein the client includes a user interface configured to take the configuration data, the method comprising:
loading and implementing an instance of the validation logic into the client;
forming a field-device-specific information package in the client from taken configuration data and the field-device-type-specific information package;
validating the field-device-specific information package in the client;
transmitting the validated field-device-specific information package from the client to the server;
accepting the validated field-device-specific information package in the server as validated;

transferring the validated field-device-specific information package to the configuration of the automation installation; and controlling at least a part of the automation installation using the validated field-device-specific information packages transferred to the configuration of the automation installation.

6. The method of claim 5, further comprising:

flagging the field-device-specific information package validated in the client as validated using a validation flag.

\* \* \* \* \*